Figure 1:
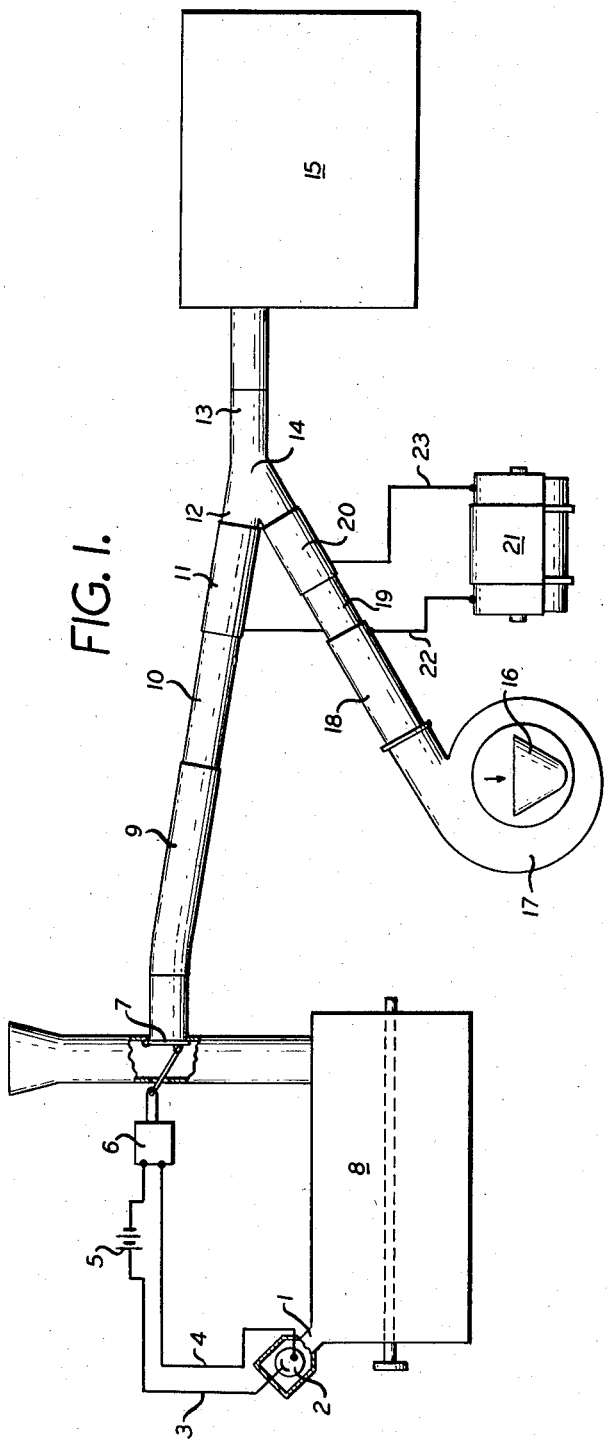

July 29, 1958 — S. N. BARUCH — 2,845,351
METHOD OF AROMATIZING COFFEE
Filed Oct. 3, 1957

INVENTOR
SYDNEY N. BARUCH

United States Patent Office 2,845,351
Patented July 29, 1958

2,845,351
METHOD OF AROMATIZING COFFEE

Sydney N. Baruch, New York, N. Y.

Application October 3, 1957, Serial No. 688,091

2 Claims. (Cl. 99—71)

My invention relates to a method of combining the aroma-bearing constituents of roasting coffee with ground or powdered coffee by means of charging the aroma-bearing particles with an electrostatic field or a high direct current voltage of one polarity and the coffee material with an electrostatic field or direct current charge of opposite polarity so that when they both come together they are substantially attracted to each other.

In order to accomplish this result, I have designed a Y-shaped tubular fixture of insulating material with a ring of electrically conductive material on the upper ends of the V section of the Y. By electrostatically charging the conductive sections of the Y, with opposite polarities, material entering each leg will be attracted to each other on entering the insulated base leg portion of the Y. The source of the electrostatic charge is an electrostatic machine or a high direct current voltage device that is commercially available.

The powdered coffee or substitute may be aromatized with the essence of roasting coffee fumes by injecting the essence and the coffee or substitute through the V legs of the Y, the essence and the powder to be aromatized being under the influence of the electrostatic charges of opposite polarity.

The output of the combined powdered coffee or a substitute and the roasting coffee fumes from the aforesaid Y, is received on any material that has been neutralized so that it does not take any charge away from the aforesaid combined mixture.

My preferred process is for combining the selected aroma of roasting coffee with powdered coffee of the so called "instant" type or ground coffee, which has been prepared in the normal or commercial manner so that the aroma will hold fast to the powdered or ground coffee.

Figure 2:
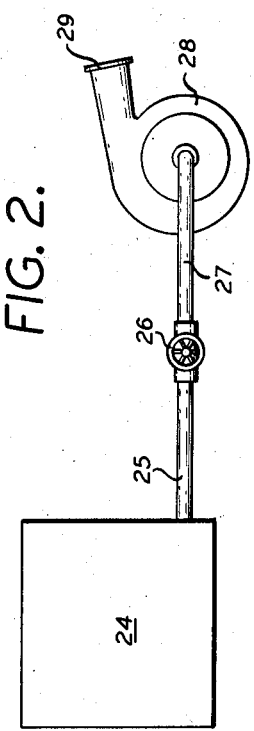

In the drawing:

Fig. 1 diagrammatically illustrates apparatus for performing the method of my invention; and Fig. 2 illustrates a modification of the apparatus of Fig. 1.

In Fig. 1 the photo electric control 2 is connected by wires 3 and 4, and battery 5 to rotary magnet 6, controlling flap valve 7, which normally keeps the vent open from roaster 8. When the color of the roasting coffee affects the photocell control 2, it causes magnet 6 to rotate and close the vent, allowing the fumes from the selected color coffee to pass through tubing 9, insulated tubing 10 and metallic tubing 11 into insulated tubing 12 and 13 of Y 14, and then into a neutral container 15. Simultaneously, the coffee is placed in hopper 16 of electric blower 17, and moves therefrom into tubing 18, insulated tubing 19, metallic tubing 20, and via insulated tubing 14, 13 into neutral container 15. In this process, the conductive metallic tubes 11 and 20 of Y 14 are connected to a source 21 of electrostatic or high direct current voltage, which is sufficiently high to establish opposite polarity electrostatic fields in tubing 11 and 20, by means of conductors 22 and 23.

When the materials pass through the electrostatic field of elements 11 and 20, they are subject to electric charge so that on entering tubing 13 of Y 14, they are mutually attracted and will hold their charge and are then discharged into the electrically neutral environment of receptacle 15.

In Fig. 2, 24 is a container of aromatic coffee essence connected by pipe 25, valve 26, pipe 27 to electric blower 28.

In order to use the essence instead of fumes directly from the roaster, the tubing 9 in Fig. 1 can be connected to outlet 29 of blower 28 and by opening valve 26 and starting blower 17 and blower 28 and also electrostatic source 21, and the operation will continue as hereinbefore set forth without the use of the roaster.

I claim:

1. A method of adding the selected aroma of roasting coffee to powdered coffee comprising producing an electric charge of one polarity on the aroma-bearing particles, producing an electric charge of the opposite polarity on the powdered coffee, and combining the aroma-bearing particles and the powdered coffee in an electrically neutral environment whereby the same are electrically attracted to each other.

2. A method of adding the selected aroma of roasting coffee to ground coffee comprising producing an electric charge of one polarity on the aroma-bearing particles, producing an electric charge of the opposite polarity on the ground coffee, and combining the aroma-bearing particles and the ground coffee in an electrically neutral environment whereby the same are electrically attracted to each other.

References Cited in the file of this patent

UNITED STATES PATENTS

| | | |
|---|---|---|
| 2,156,212 | Wendt et al. | Apr. 25, 1939 |
| 2,270,341 | Ransburg | Jan. 20, 1942 |
| 2,680,687 | Lemmonier | June 8, 1954 |